United States Patent
Walls et al.

(10) Patent No.: US 7,390,139 B2
(45) Date of Patent: Jun. 24, 2008

(54) BOSS ASSEMBLY FOR THREADED COUPLING

(75) Inventors: Raul A. Walls, Columbus, IN (US); Jeremy K. Gahimer, Columbus, IN (US)

(73) Assignee: Valeo Sylvania LLC, Seymour, IN (US)

( * ) Notice: Subject to any disclaimer, the term of this patent is extended or adjusted under 35 U.S.C. 154(b) by 0 days.

(21) Appl. No.: 11/528,807

(22) Filed: Sep. 28, 2006

(65) Prior Publication Data

US 2008/0080929 A1   Apr. 3, 2008

(51) Int. Cl.
*F16D 1/08* (2006.01)
(52) U.S. Cl. ............... 403/356; 403/355; 403/408.1
(58) Field of Classification Search ........... 403/353, 403/355, 356, 362, 373, 408.1, 366, 368, 403/370, 374.3
See application file for complete search history.

(56) References Cited

U.S. PATENT DOCUMENTS

| | | | | |
|---|---|---|---|---|
| 3,560,031 | A * | 2/1971 | Gilmour, Jr. | 403/370 |
| 4,620,814 | A * | 11/1986 | May | 403/370 |
| 5,469,648 | A * | 11/1995 | Jones et al. | 37/457 |
| 6,517,031 | B2 * | 2/2003 | Uchiyama | 403/353 |
| 7,086,185 | B2 * | 8/2006 | Pasqualini et al. | 403/355 |

* cited by examiner

*Primary Examiner*—Daniel P. Stodola
*Assistant Examiner*—Michael P. Ferguson
(74) *Attorney, Agent, or Firm*—William E. Meyer

(57) ABSTRACT

A minimal volume boss may be formed as key and keyway assembly defining a shaft along the interface between the two pieces. A threaded fastener may be threaded into the shaft to lock the two pieces together. Because the key can have minimal volume, the cavitation spot opposite the key, typically formed during molding can be eliminated on fine surfaces. By properly keying the pieces, rotation between parts can also be eliminated. This helps automated torque sensing tools read and apply the proper torque in automated assembly.

4 Claims, 4 Drawing Sheets

BOSS ASSEMBLY FOR THREADED COUPLING

TECHNICAL FIELD

The invention relates to molded plastic bodies. More particularly the invention is concerned with molded plastic bodies formed with bosses for threaded couplings.

BACKGROUND ART

Bosses are commonly formed on the surfaces of plastic moldings. A boss may include a shaft opening to receive a threaded fasten used to mount a second molded piece or other mechanical item. The boss commonly has a substantial volume relative to the adjacent wall thickness. As a result during molding process boss volume contracts, and sucks in the surrounding material. This can result in a cavitation spot on the wall opposite the boss. The cavitation spot is an irregular depression, and in the case of a high quality surface product like an aluminized optical reflector, the cavitation spot is a defect. There is a need to eliminate such defects in high quality surfaces while still providing for boss mountings.

DISCLOSURE OF THE INVENTION

A boss assembly for threaded coupling may be made with a first molded body having a mounting surface having a key unitary with and projecting axially from the mounting surface. The key has an exterior surface having a mating portion and an axially extending concave portion. A second molded body is formed also with a mounting surface, and a boss unitary with and projecting axially from the mounting surface of the second molded body. The boss has an interior wall defining a keyway with a mating portion sized and shaped to receive and conformally mate with the mating portion of the key. The interior wall also has an axially extending concave portion. The mounting surface of the first molded body is mounted to the mounting surface of the second molded body; with the key positioned in the keyway, with the mating portion of the key adjacent the mating portion of the keyway. The concave portion of the key is positioned opposite the concave portion of the key thereby defining between the key and the boss an open, axially extending shaft. A threaded fastener may be mounted in the shaft locking the key in the boss. Once assembled the keyed elements are locked and help prevent rotation between the parts.

BEST MODE FOR CARRYING OUT THE INVENTION

Figure 1:
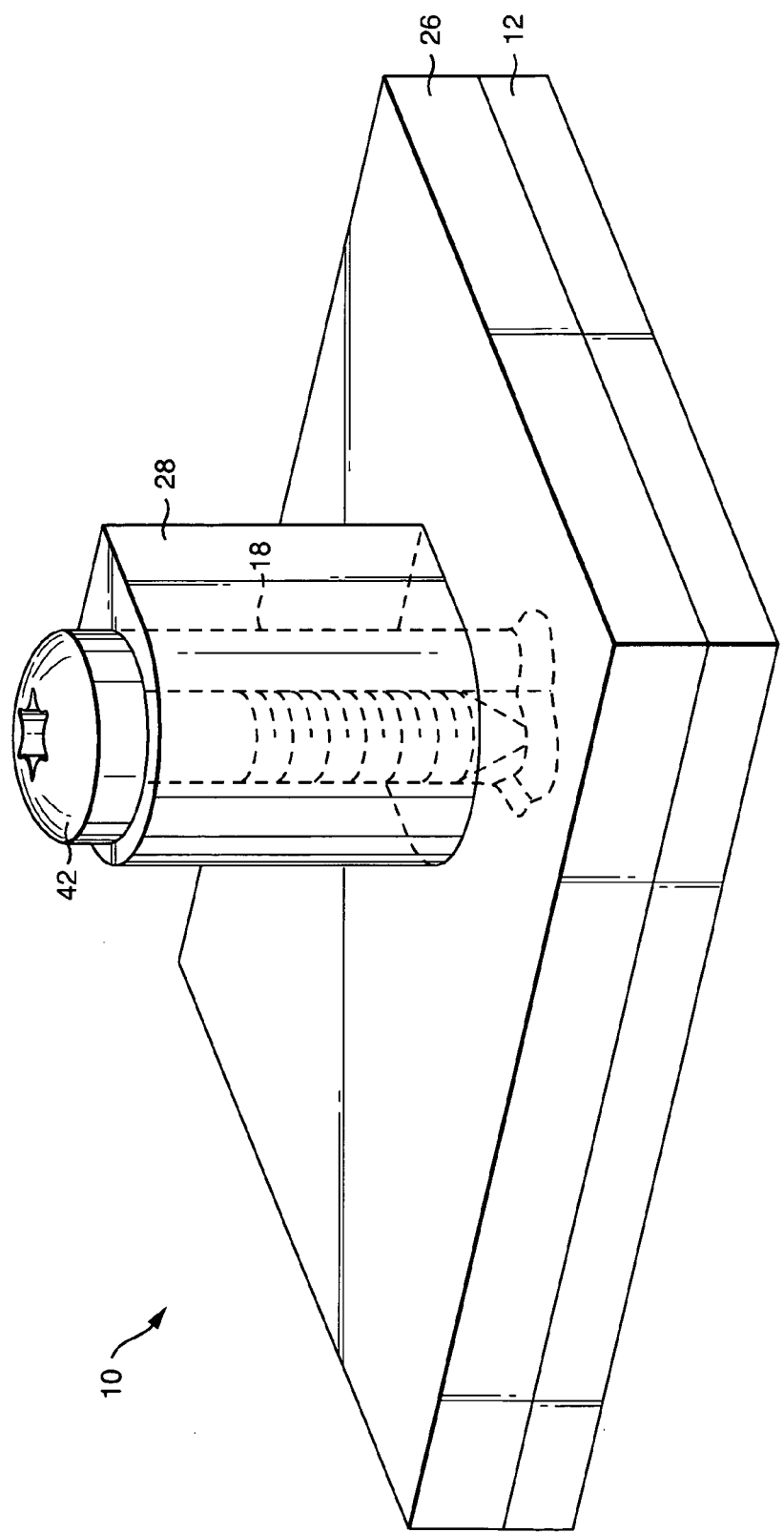
FIG. 1 shows a perspective cut away view of a first molded body mated to a second molded body with a threaded fastener.
Figure 2:
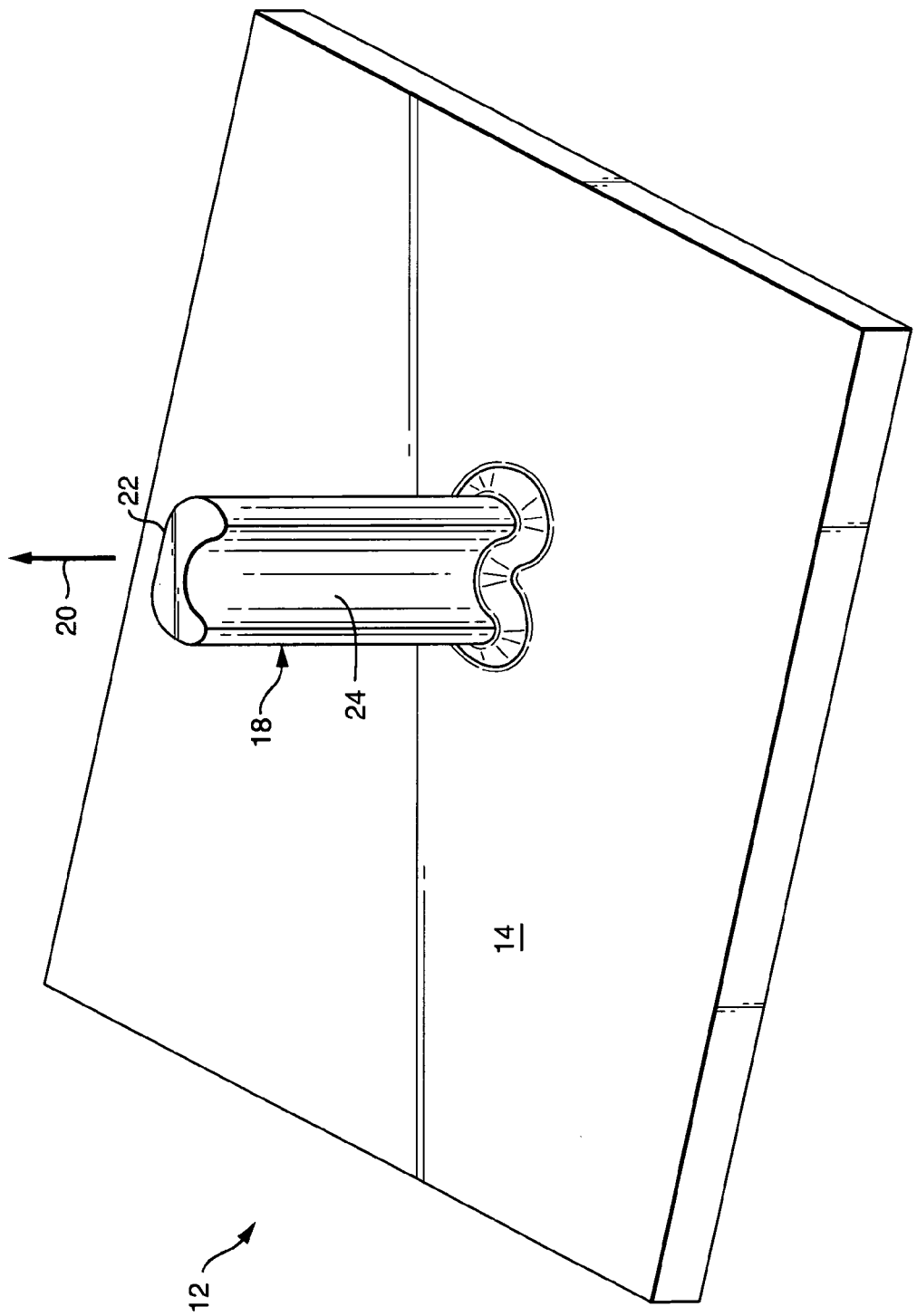
FIG. 2 shows a perspective view of a section of a first molded body with a projecting key.

FIG. 1 shows a perspective cut away view of a first molded body mated to a second molded body with a threaded fastener. FIG. 2 shows a perspective view of a section of a first molded body 12 with a projecting key 18. The boss assembly 10 is made as coupled portions of two molded pieces. The first molded body 12, such as a section of an automotive headlamp, includes a mounting surface 14 where a second molded piece 26 is to be mounted. Formed on the first molded body 12 is a key 18. The key 18 is unitary with and projects axially 20 away from the mounting surface 14. It is convenient to co-mold the first molded body 12 with the key 18 as a formed projection. The key 18 has an exterior surface including a mating portion 22. The preferred mating portion 22 of the key 18 is not a section of a body of rotation, so the key 18 does not rotate with respect to the keyway 30 to be discussed. The exterior surface of the key 18 also has an axially extending concave portion 24. In the preferred embodiment the concave portion 24 of the key 18 includes a section of a circular cylinder to define with the keyway 30 to be discussed, a cylindrical shaft 40 to receive a threaded fastener 42.

Figure 3:
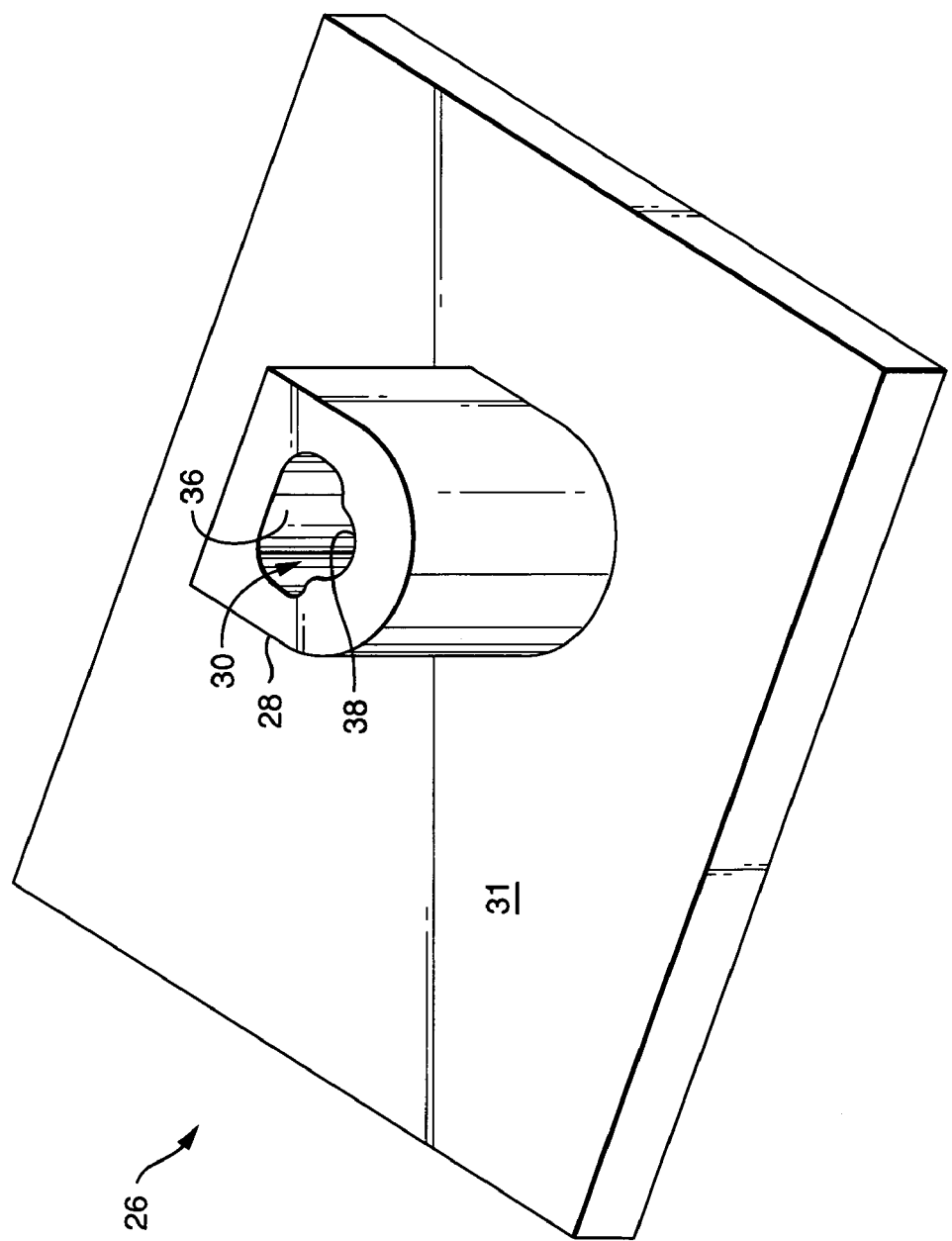
FIG. 3 shows a perspective view of a section of a second molded body with a projecting boss and keyway.

FIG. 3 shows a perspective view of a section of a second molded body 26 with a projecting boss 28 and keyway 30. The boss assembly 10 includes a second molded body 26 also having a front face 31 and on the opposite side a mounting surface 32. The second molded body 26 includes a boss 28. The boss 28 is unitary with and projects axially from the front face 31. The boss 28 has an interior wall that defines a keyway 30. The keyway 30 has a mating portion 36 sized and shaped to slidingly receive and conformally mate with the mating portion 22 of the key 18. The key 18 can then be snuggly and conformally mated to the boss 28 in the keyway 30. The keyway 30 also includes an axially extending concave portion 38. In the preferred embodiment the concave portion 38 of the keyway 30 includes a section of a circular cylinder.

Figure 4:
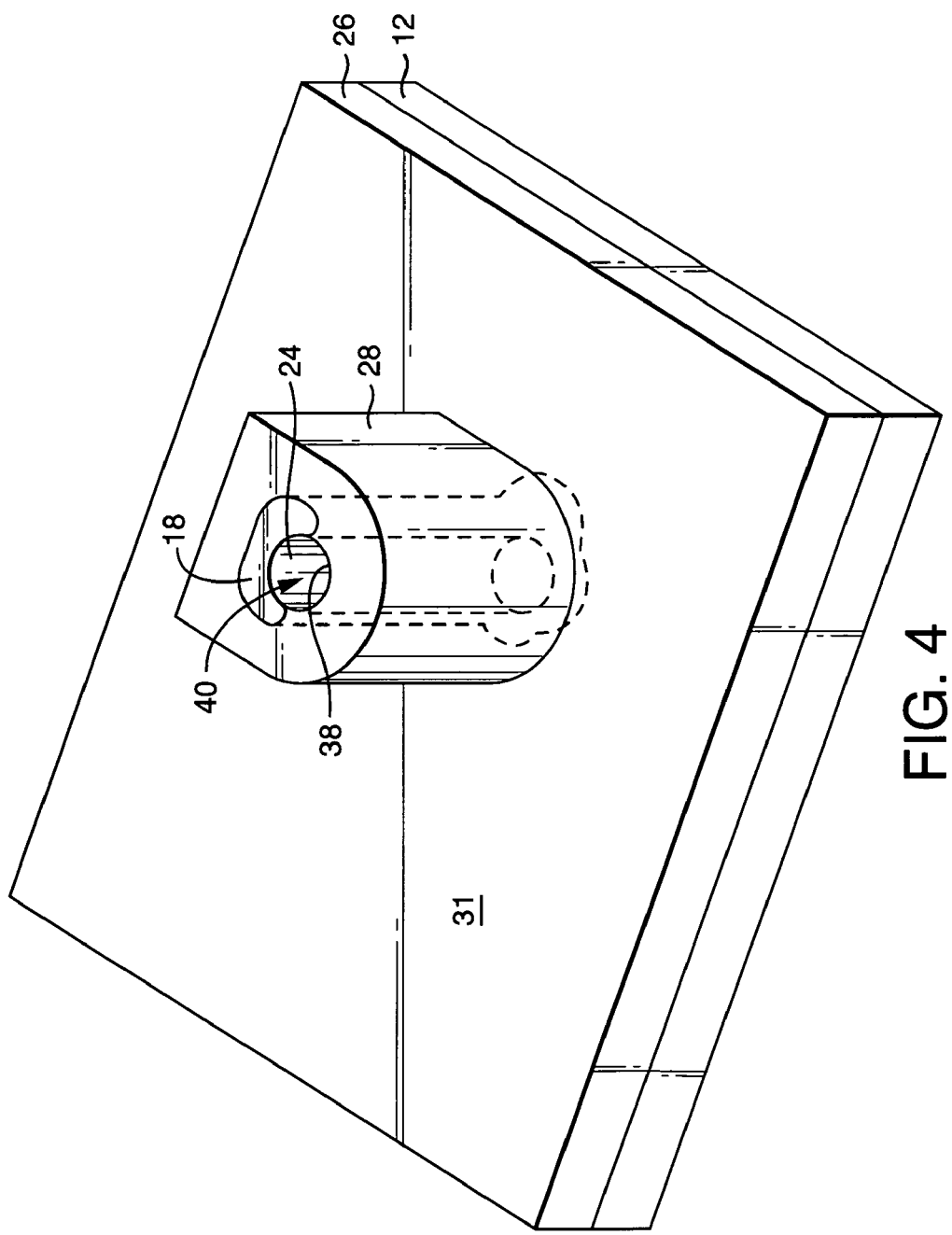
FIG. 4 shows a perspective view of a first molded body mated to a second molded body with a projecting key position in a keyway.

FIG. 4 shows a perspective view of a first molded body 12 mated to a second molded body 26 with a projecting key 18 positioned in a keyway 30. The boss assembly 10 is put together by positioning the mounting surface 14 of the first molded body 12 being mounted to the mounting surface 32 of the second molded body 26 with the key 18 being positioned in the keyway 30. The mating portion 22 of the key 18 is positioned adjacent the mating portion 36 of the keyway 30 with the cylindrical concave portion 24 of the key 18 opposite the cylindrical concave portion 38 of the keyway 30. The two concave portions (24, 38) then define between the key 18 and the boss 28 an open, axially extending shaft 40.

FIG. 1 shows a perspective cut away view of a first molded body 12 mated to a second molded body 26 with a threaded fastener 42. A threaded fastener 42, such as a screw is then mounted in the shaft 40 locking the key 18 in the boss 28, and as a result locking the first molded body 12 to the second molded body 26. Because the key 18 and keyway 30 are mated along surfaces that are not surfaces of rotation, the two bodies (12, 26) do not rotate around the fastener axis, but are held in a fixed relation. Because the key 18 is formed as a narrow projection, its volume is relatively small, so the molding cavitation on the opposite side of the first molded body 12 is substantially reduced if not totally eliminated. Similarly, because the boss 28 is formed as a narrow wall defining a hollow keyway, the molding cavitation in the second molded body 26 is also substantially reduced if not eliminated.

While there have been shown and described what are at present considered to be the preferred embodiments of the invention, it will be apparent to those skilled in the art that various changes and modifications can be made herein without departing from the scope of the invention defined by the appended claims.

What is claimed is:
1. A boss assembly for threaded coupling comprising:
a first molded body having a mounting surface;

a key unitary with and projecting axially from the mounting surface, the key having an exterior surface having a mating portion and an axially extending concave portion;

a second molded body having a mounting surface;

a boss unitary with and projecting axially from a front surface of the second molded body, the boss having an interior wall defining a keyway with a mating portion sized and shaped to receive and conformally mate with the mating portion of the key and the keyway further having an axially extending concave portion, the mounting surface of the first molded body being mounted to a side opposite to the front face of the second molded body; with the key positioned in the keyway, with the mating portion of the key adjacent the mating portion of the keyway and the concave portion of the key opposite the concave portion of the keyway thereby defining between the key and the boss an open, axially extending aperture, whereby a threaded fastener may be mounted in the aperture locking the key in the boss.

2. The boss assembly for threaded coupling in claim 1, wherein the mating portion of the key is not a section of a body of rotation.

3. A boss assembly for threaded coupling comprising:

a first molded body having a mounting surface;

a key unitary with and projecting axially from the mounting surface, the key having an exterior surface having a mating portion and an axially extending concave portion;

a second molded body having a mounting surface;

a boss unitary with and projecting axially from a front surface of the second molded body, the boss having an interior wall defining a keyway with a mating portion sized and shaped to receive and conformally mate with the mating portion of the key and the keyway further having an axially extending concave portion, the mounting surface of the first molded body being mounted to a side opposite to the front face of the second molded body; with the key positioned in the keyway, with the mating portion of the key adjacent the mating portion of the keyway and the concave portion of the key opposite the concave portion of the keyway thereby defining between the key and the boss an open, axially extending aperture, whereby a threaded fastener may be mounted in the aperture locking the key in the boss;

wherein the concave portion of the key includes a section of a circular cylinder, the concave portion of the keyway includes a section of a circular cylinder, whereby the open, axially extending aperture is substantially a cylindrical opening.

4. A boss assembly comprising:

a first molded body having a mounting surface;

a key unitary with and projecting axially from the mounting surface, the key having an exterior surface having a mating portion, the mating portion of the key not being a section of a body of rotation, and having an axially extending concave portion, the concave portion of the key including a section of a circular cylinder;

a second molded body having a front face and on a side opposite the front face a mounting surface;

a boss unitary with and projecting axially from the front face of the second molded body;

the boss having an interior wall defining a keyway with a mating portion sized and shaped to receive and conformally mate with the mating portion of the key and the interior wall defining an axially extending concave portion, the concave portion of the keyway including a section of a circular cylinder, the mounting surface of the first molded body being mounted to the mounting surface of the second molded body; with the key being positioned in the keyway with the mating portion of the key adjacent the mating portion of the keyway and the cylindrical concave portion of the key opposite the cylindrical concave portion of the keyway thereby defining between the key and the boss an open, axially extending aperture; and a threaded fastener mounted in the aperture locking the key in the boss.

* * * * *